United States Patent
Yang et al.

(10) Patent No.: US 11,310,840 B2
(45) Date of Patent: Apr. 19, 2022

(54) RANDOM ACCESS METHOD, USER EQUIPMENT, AND STORAGE MEDIUM

(71) Applicant: ZTE Corporation, Shenzhen (CN)

(72) Inventors: Ling Yang, Shenzhen (CN); Yajun Zhao, Shenzhen (CN); Xincai Li, Shenzhen (CN); Hanging Xu, Shenzhen (CN)

(73) Assignee: XI'AN ZHONGXING NEW SOFTWARE CO., LTD., Shanxxi (CN)

( * ) Notice: Subject to any disclaimer, the term of this patent is extended or adjusted under 35 U.S.C. 154(b) by 0 days.

(21) Appl. No.: 16/766,806

(22) PCT Filed: Nov. 26, 2018

(86) PCT No.: PCT/CN2018/117521
§ 371 (c)(1),
(2) Date: May 26, 2020

(87) PCT Pub. No.: WO2019/101201
PCT Pub. Date: May 31, 2019

(65) Prior Publication Data
US 2021/0022176 A1  Jan. 21, 2021

(30) Foreign Application Priority Data
Nov. 24, 2017 (CN) .......................... 201711213789.9

(51) Int. Cl.
*H04W 74/08* (2009.01)
*H04L 5/00* (2006.01)

(52) U.S. Cl.
CPC ......... *H04W 74/085* (2013.01); *H04L 5/0005* (2013.01); *H04W 74/0875* (2013.01)

(58) Field of Classification Search
CPC . H04W 74/00; H04W 74/08; H04W 74/0875; H04W 74/085; H04L 5/0005; H04L 5/00
See application file for complete search history.

(56) References Cited

U.S. PATENT DOCUMENTS

| 2017/0303212 | A1* | 10/2017 | Takeda | H04W 52/36 |
| 2019/0159261 | A1* | 5/2019 | Jung | H04W 48/08 |
| 2020/0305200 | A1* | 9/2020 | Jiang | H04W 36/08 |

FOREIGN PATENT DOCUMENTS

| CN | 102014497 A | 4/2011 |
| CN | 103037441 A | 4/2013 |

(Continued)

OTHER PUBLICATIONS

International Search Report for corresponding application PCT/CN2018/117521 filed Nov. 26, 2018; dated Feb. 25, 2019.

(Continued)

*Primary Examiner* — Jianye Wu
(74) *Attorney, Agent, or Firm* — Cantor Colburn LLP

(57) ABSTRACT

Provided are a random access method, UE and a storage medium. The method includes: performing, by a transmission device, random access on one uplink carrier of L uplink carriers configured in a cell, wherein the L is a positive integer greater than or equal to 1, and the uplink carrier includes at least one of the followings: a Non-Supplement Uplink (SUL) carrier and an SUL carrier.

20 Claims, 3 Drawing Sheets

(56) References Cited

FOREIGN PATENT DOCUMENTS

| | | |
|---|---|---|
| CN | 106686727 A | 5/2017 |
| CN | 106993335 A | 7/2017 |
| WO | 2016175631 A1 | 11/2016 |

OTHER PUBLICATIONS

Ericsson, "Random Access and SUL", 3GPP TSG-RAN WG2 #100, Reno Nevada, Nov. 27, 2017, R2-1713476.
European Search Report for corresponding application EP 18 88 1856; dated Nov. 4, 2020.
Huawei, HiSilicon, "Complete text proposal for NR random access procedure", 3GPP TSG-RAN WG2 Meeting #100, Reno Nevada, USA Nov. 27, 2017, R2-1712906.
Huawei, HiSilicon, "Impacts of SUL on PHR", 3GPP TSG-RAN WG2 Meeting #100, Reno Nevada USA, Nov. 27, 2017, R2-1713948.
Lenovo, "Discussion on NB-IoT Multi-carrier operation", #GPP TGS RAN WG1 Meeting #84, Feb. 15, 2016, R1-161008.

\* cited by examiner

RANDOM ACCESS METHOD, USER EQUIPMENT, AND STORAGE MEDIUM

CROSS-REFERENCE TO RELATED APPLICATION

The present disclosure is based upon and claims priority to Chinese Patent Application No. 201711213789.9, filed on Nov. 24, 2017, the entire contents of which are incorporated herein by reference.

TECHNICAL FIELD

The present disclosure relates to the field of communications, and in particular to a random access method, User Equipment (UE) and a storage medium.

BACKGROUND

In a New Radio (NR) system of the relevant art, it is supported presently that one cell is configured with two uplink carriers, one of which is an NR Non-Supplement Uplink (Non-SUL) carrier, and the other is an SUL carrier. For such a case, if different UEs transmit Preamble codes on same time-frequency domain resources of different carriers, and a Random Access-Radio Network Temporary Identity (RA-RNTI) is calculated in a manner same as that in traditional Long Term Evolution (LTE), an eNB cannot identify which UE transmits the preamble code because RA-RNTIs corresponding to the different UEs are the same. When corresponding eNB transmits a Random Access Response (RAR), the RA-RNTI used is the same, so that the UE mistakenly considers that the transmission of the Preamble code is successful, and transmits a Msg3 message; and finally, the access of a Physical Random Access Channel (PRACH) is failed. Bandwidth Partial (BWP) in the Non-SUL carrier and BWP on the SUL carrier are also confronted with the above problem. In view of this, it is necessary to solve a problem of the access of the PRACH due to a fact that the Preamble code is simultaneously transmitted by the UE on different carriers, or on same time-frequency resources of BWPs in the different carriers.

Concerning the above-mentioned problem in the relevant art, an effective solution hasn't been found till now.

SUMMARY

The embodiments of the present disclosure provide a random access method, a UE and a storage medium.

According to an embodiment of the present disclosure, an random access method is provided, which includes that: a transmission device performs random access on one uplink carrier of L uplink carriers configured in a cell, wherein the L is a positive integer greater than or equal to 1, and the uplink carrier includes at least one of the followings: a Non-SUL carrier and an SUL carrier.

According to another embodiment of the present disclosure, a UE is provided, which includes: a communication module, configured to perform random access on one uplink carrier of L uplink carriers configured in a cell, wherein the L is a positive integer greater than or equal to 1, and the uplink carrier includes at least one of the followings: a Non-SUL carrier and an SUL carrier.

According to a still another embodiment of the present disclosure, a storage medium is further provided; the storage medium stores a computer program; and the computer program executes, when being run by a processor, the method of the embodiments of the present disclosure.

According to a still another embodiment of the present disclosure, a processor is further provided; the processor is configured to run a computer program; and the computer program executes, when running, the method of the embodiments of the present disclosure.

According to a further another embodiment of the present disclosure, a UE is further provided, which includes: a processor and a memory configured to store a computer program capable of running on the processor; and the processor executes, when being configured to run the computer program, the method of the embodiments of the present disclosure.

Through the embodiments of the present disclosure, by selecting one uplink carrier for random access, a technical problem of access failure easily caused when a multi-carrier cell is accessed in the relevant art is solved, a success rate for access is improved, and a solution for performing random access on an SUL carrier is provided.

BRIEF DESCRIPTION OF THE DRAWINGS

The accompanying drawings are described here to provide a further understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below in detail with reference to the accompanying drawings and in combination with the embodiments. It is be noted that the embodiments of the present disclosure and the characteristics of the embodiments may be combined with each other if there is no conflict.

It is to be noted that, terms such as "first" and "second" in the specification, claims and accompanying drawings of the present disclosure are only used to distinguish similar objects and are unnecessary to describe a special order or a precedence order.

Embodiment 1

A network architecture in this embodiment of the present disclosure includes: a UE (such as a terminal) and an eNB. The UE and the eNB may perform information interaction via a network.

Figure 1:
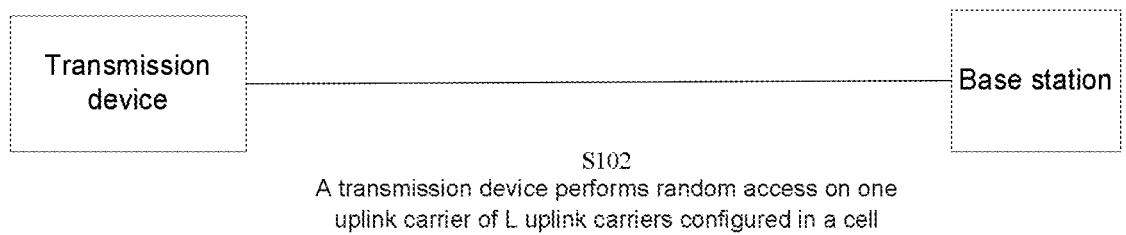
FIG. 1 is a flowchart of a random access method according to an embodiment of the present disclosure.

This embodiment provides a random access method. FIG. 1 is a flowchart of a random access method according to an embodiment of the present disclosure. As shown in FIG. 1, the process includes the following steps.

At Step S102, a transmission device performs random access on one uplink carrier of L uplink carriers configured in a cell, wherein the L is a positive integer greater than or equal to 1, and the uplink carrier includes at least one of the followings: a Non-SUL carrier and an SUL carrier.

Through technical solutions in this embodiment of the present disclosure, by selecting one uplink carrier for random access, a technical problem of access failure easily caused when a multi-carrier cell is accessed in the relevant art is solved, a success rate for access is improved, and a solution for performing random access on an SUL carrier is provided.

Optionally, a transmission device serving as an execution main body of the above step may be a terminal but is not limited thereto.

In addition to a PRACH access process, the solutions in this embodiment are also applied to all signals transmitting on the uplink carrier or a BWP.

In an exemplary embodiment, when the L uplink carriers configured in the cell have the SUL carrier, at least one of the following manners is used to determine an uplink carrier for performing the PRACH access process.

The transmission device determines, based on a measured Reference Signal Receiving Power (RSRP) value and/or a first RSRP threshold value, the uplink carrier for performing the PRACH access process. The RSRP value and/or the first RSRP threshold value are obtained on the basis of measuring a special measurement signal transmitted on a downlink resource. Optionally, the special measurement signal includes at least one of the followings: a Synchronization Signal Block (SSB), a Channel State Information-Reference Signal (CSI-RS), a Primary Synchronization Signal (PSS), a Secondary Synchronization Signal (SSS), and a Physical Broadcast Channel (PBCH).

The transmission device determines, based on carrier information indicated by signaling, the uplink carrier for performing the PRACH access process.

The transmission device determines, based on default or predefined information, the uplink carrier for performing the PRACH access process.

In an exemplary embodiment, the operation of determining the uplink carrier for performing the PRACH access process based on the measured RSRP value and/or the first RSRP threshold value includes at least one of the followings.

The measured RSRP value is compared with the first RSRP threshold value; when the measured RSRP value is smaller than or equal to the first RSRP threshold value, the SUL carrier or the Non-SUL carrier is selected; and when the measured RSRP value is greater than or equal to the first RSRP threshold value, the Non-SUL carrier or the SUL carrier is selected. In this embodiment, two combinations are included. When the measured RSRP value is smaller than or equal to the first RSRP threshold value, the SUL carrier is selected; or otherwise, the Non-SUL carrier is selected. When the measured RSRP value is smaller than or equal to the first RSRP threshold value, the Non-SUL carrier is selected or otherwise, the SUL carrier is selected.

In an exemplary embodiment, the first RSRP threshold value is determined in at least one of the following manners: the first RSRP threshold value is determined based on a second threshold value selected by the cell and an offset; and the first RSRP threshold value is determined or obtained based on pre-defined, notified or indicated information.

In an exemplary embodiment, the notified or indicated information includes at least one of the followings: high layer Radio Resource Control (RRC) signaling, physical layer Downlink Control Information (DCI) signaling, physical layer Media Access Control (MAC) signaling, Remaining Minimum System Information (RMSI), System Information (SI) and Other System Information (OSI).

In an exemplary embodiment, the operation that the first RSRP threshold value is determined based on a second threshold value selected by the cell and an offset includes one of the followings: the first RSRP threshold value is determined by adding the offset to the second threshold value selected by the cell; and the first RSRP threshold value is determined by subtracting the from the second threshold value selected by the cell.

In an exemplary embodiment, the transmission device determines or obtains at least one of the following parameters: the first RSRP threshold value, the offset, the second threshold value, and a parameter required for cell selection, in at least one of the following manners.

The second threshold selected by the cell is determined according to a first set of parameter, the first RSRP threshold for carrier selection in the cell is determined according to a second set of parameter, and relative to the first set of parameter, the second set of parameter includes an offset parameter.

The first set of parameter is shared for cell selection and carrier selection in the cell. When the first set of parameter is used for the carrier selection in the cell, an independent offset parameter is configured.

In this embodiment, at least one parameter in the first set of parameter, and/or, the second set of parameter is obtained in at least one of the following manners: high layer RRC signaling, MAC layer signaling, physical layer DCI signaling, a preset configuration, RMSI, OSI and SI.

In an exemplary embodiment, the operation that the transmission device performs the random access on the uplink carrier includes: when the number of failure times that a Preamble code is transmitted on the uplink carrier reaches a special number of transmission times, the transmission device performs PRACH access or Preamble code transmission on an uplink carrier determined by a special rule.

In an exemplary embodiment, the method further includes: when the number of failure times that the Preamble code is transmitted on the uplink carrier reaches the special number of transmission times, a Preamble counter is processed according to at least one of the following methods: a current value of the Preamble counter is kept; and the Preamble counter is set as an initial value.

In an exemplary embodiment, the method further includes: before the transmission device performs PRACH access or Preamble code transmission on an uplink carrier determined by a special rule, the Preamble counter is processed according to at least one of the following methods: a kept value of the Preamble counter is taken as an initial value of the Preamble counter on the carrier after switching; the initial value of the Preamble counter on the carrier after switching is a default initial value; and the initial value of the Preamble counter on the carrier after switching is a value obtained by subtracting or adding a first Back Off value upon the kept value of the Preamble counter.

In an exemplary embodiment, the method further includes: when the number of failure times that the Preamble code is transmitted on the configured or selected uplink carrier reaches the special number of transmission times, a power for transmitting the Preamble code is processed according to at least one of the following methods: a current power for transmitting the Preamble code is kept; and the transmitting power of the Preamble code is set as an initial value.

In an exemplary embodiment, the method further includes: before the transmission device performs PRACH access or Preamble code transmission on an uplink carrier determined by a special rule, the power for transmitting the Preamble code is processed according to at least one of the following methods: the kept transmitting power of the Preamble code is taken as an initial transmitting power for transmitting the Preamble code on the carrier after switching; the initial transmitting power for transmitting the Preamble code on the carrier after switching is a default initial value and the power for transmitting the Preamble code on the carrier after switching is obtained by adding or subtracting a second Back Off value upon the kept power for transmitting the Preamble code.

In an exemplary embodiment, the method further includes: when the number of failure times that the Preamble code is transmitted on the configured or selected uplink carrier reaches the special number of transmission times, a power ramping step on the carrier after switching is processed according to at least one of the following methods: the power ramping step is a value configured on a current carrier; the power ramping step is obtained by adding or subtracting a ramping amount upon a power ramping step on the carrier before switching; the power ramping step is obtained by adding or subtracting a ramping amount upon a value configured on a current carrier; and the power ramping step is a power ramping step on the carrier before switching.

In an exemplary embodiment, the method further includes: when the number of failure times that the Preamble code is transmitted on the configured or selected uplink carrier reaches the special number of transmission times, the number of transmission times of the Preamble code on the carrier after switching is at least one of the followings: the number of transmission times of the Preamble code is a value configured on a current carrier; the number of transmission times of the Preamble code is the special number of transmission times; the number of transmission times of the Preamble code is the maximum number of transmission times of the Preamble code; and the number of transmission times of the Preamble code is a value obtained by subtracting the number of retransmission times of the Preamble code configured on the carrier before switching upon the maximum number of transmission times of the Preamble code.

When the number of retransmission times of the Preamble code configured on the carrier before switching is smaller than the maximum number of transmission times of the Preamble code, the number of transmission times of the Preamble code is one of the followings: the number of transmission times of the Preamble code is obtained by adding or subtracting a third Back Off value upon the number of transmission times of the Preamble code on the carrier before switching; and the number of transmission times of the Preamble code is obtained by adding or subtracting a third Back Off value upon a value configured on a current carrier; and the number of transmission times of the Preamble code is obtained by adding or subtracting a third Back Off value upon the maximum number of transmission times of the Preamble code.

In an exemplary embodiment, the special rule includes at least one of the followings: determining, according to an RSRP value and/or a first RSRP threshold value measured on a downlink resource, the uplink resource for performing the PRACH access process; switching to another uplink carrier configured in the cell; switching to an uplink carrier for configuring and transmitting a Physical Uplink Control Channel (PUCCH) and/or Physical Uplink Shared Channel (PUSCH); and switching to an uplink carrier that is defaulted or has a priority meet a preset requirement. The priority meets the preset requirement, which may be that the priority is higher than a preset threshold value, that is, an uplink carrier with a high priority.

In an exemplary embodiment, the special number of transmission times includes one of the followings: the special number of transmission times is a value greater than the maximum number of transmission times of the Preamble code, the special number of transmission times is a value equal to the maximum number of transmission times of the Preamble code, the special number of transmission times is a value smaller than the maximum number of transmission times of the Preamble code.

In an exemplary embodiment, during the PRACH access process of the uplink carrier, an RA-RNTI is processed in at least one of the following manners: when different transmission devices transmit the Preamble code on same PRACH resources of different uplink carriers, the RA-RNTI is processed in at least one of the following manners: by carrying a carrier index in the RA-RNTI; carrying a PRACH occasion index in the RA-RNTI; and by uniformly numbering PRACH frequency domain resources on the different carriers, f_ids used to calculate the RA-RNTIs on the different carriers being different in value or value range.

When one carrier is configured with one or more BWPs, the RA-RNTI is processed in at least one of the following manners: by carrying a BWP index in the RA-RNTI; by carrying a carrier index in the RA-RNTI; by carrying a PRACH occasion index in the RA-RNTI; and by uniformly numbering PRACH frequency domain resources on different BWPs, f_ids used to calculate the RA-RNTIs on the different BWPs being different in value or value range.

When each carrier is configured with one or more BWPs during different carriers, the RA-RNTI is processed in at least one of the following manners: by uniformly numbering BWPs on the different carriers, and carrying a carrier index in the RA-RNTI; by carrying a BWP index in the RA-RNTI; by carrying a carrier index in the RA-RNTI; by carrying a PRACH occasion index in the RA-RNTI; and by uniformly numbering PRACH frequency domain resources of BWPs on the different carriers, f_ids used to calculate the RA-RNTIs on the different BWPs being different in value or value range.

In an exemplary embodiment, a case where the SUL carrier is configured in the cell includes at least one of the followings.

For the Non-SUL carrier and the SUL carrier, at least one of the following communication parameters is respectively configured.

A Preamble code counter, a power ramping step, a power for transmitting a Preamble code, the number of transmission times of the Preamble code, a format of the Preamble code, a Subcarrier Spacing (SCS), a BWP, a PRACH time domain resource, a PRACH occasion, a start point of a PRACH frequency domain resource, the number of PRACH frequency domain resources, a PRACH frequency domain offset, a first Back Off value, a second Back Off value and a third Back Off value.

For the Non-SUL carrier and the SUL carrier, a common parameter is configured or initialized. The common parameter may be at least one of the followings: a Preamble code counter, a power ramping step, a power for transmitting a Preamble code, the number of transmission times of the Preamble code, a format of the Preamble code, a subcarrier spacing (SCS), a BWP, a PRACH time domain resource, a PRACH occasion, a start point of a PRACH frequency domain resource, the number of PRACH frequency domain resources, a PRACH frequency domain offset, a first Back Off value, a second Back Off value and a third Back Off value. A parameter not configured in the common parameter is configured independently.

In an exemplary embodiment, the communication parameter is configured in at least one of the following manners: high layer RRC signaling, SI, RMSI, OSI, physical layer DCI signaling, a pre-defined manner, and MAC layer signaling.

By means of the above-mentioned descriptions on the implementation manner, the person skilled in the art may clearly understand that the present disclosure may be implemented by software plus a necessary universal hardware platform, and may also be implemented by hardware, but under most conditions, the former is a better implementation manner. Based on such an understanding, the technical solutions of the present disclosure essentially, or the part contributing to the conventional art may be implemented in a form of a software product. The computer software product is stored in a storage medium (such as a Read Only Memory (ROM)/Random Access Memory (RAM), a magnetic disk, and an optical disc) and includes a plurality of instructions for instructing a terminal device (which may be a mobile phone, a computer, a server, or a network device, etc.) to execute the methods described in the embodiments of the present disclosure.

Embodiment 2

This embodiment further provides a UE for implementing the above-mentioned embodiments and preferred implementation manners. A content that has been described will no longer be repeated. As used below, the term "module" may implement a combination of software and/or hardware having a predetermined function. Although the device described in the following embodiments is implemented by software preferably, the implementation of hardware or a combination of the software and the hardware may also be conceivable.

Figure 2:
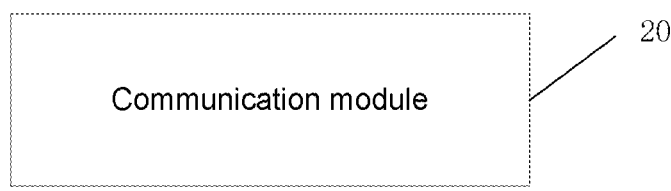
FIG. 2 is a structural block diagram of a UE according to an embodiment of the present disclosure.

FIG. 2 is a structural block diagram of a UE according to an embodiment of the present disclosure. As shown in FIG. 2, the UE includes: a communication module 20, configured to perform random access on one uplink carrier of L uplink carriers configured in a cell, wherein the L is a positive integer greater than or equal to 1, and the uplink carrier includes at least one of the followings: a Non-SUL carrier and an SUL carrier.

In an exemplary embodiment, the UE further includes a processing module, configured to use, when the L uplink carriers configured in the cell have the SUL carrier, at least one of the following manners to determine an uplink carrier for performing the PRACH access process: determining, based on a measured RSRP value and/or a first RSRP threshold value, the uplink carrier for performing the PRACH access process, the RSRP value and/or the first RSRP threshold value being obtained on the basis of measuring a special measurement signal transmitted on a downlink resource; determining, based on carrier information indicated by signaling, the uplink carrier for performing the PRACH access process; and determining, based on default or predefined information, the uplink carrier for performing the PRACH access process.

In an exemplary embodiment, the processing module is configured to compare the measured RSRP value with the first RSRP threshold value; select, when the measured RSRP value is smaller than or equal to the first RSRP threshold value, the SUL carrier or the Non-SUL carrier; and select, when the measured RSRP value is greater than or equal to the first RSRP threshold value, the Non-SUL carrier or the SUL carrier.

In an exemplary embodiment, the processing module is configured to determine the first RSRP threshold value in at least one of the following manners: determining the first RSRP threshold value based on a second threshold value selected by the cell and an offset; and determining or obtaining the first RSRP threshold value based on pre-defined, notified or indicated information.

In an exemplary embodiment, the operation that the processing module is configured to determine the first RSRP threshold value based on a second threshold value selected by the cell and an offset includes one of the followings: determining the first RSRP threshold value by adding the offset to the second threshold value selected by the cell; and determining the first RSRP threshold value by subtracting the from the second threshold value selected by the cell.

In an exemplary embodiment, the processing module is configured to determine or obtain at least one of the following parameters: a first RSRP threshold value, an offset, a second threshold value, and a parameter required for cell selection, in at least one of the following manners: determining the second threshold selected by the cell according to a first set of parameter, and determining the first RSRP threshold for carrier selection in the cell according to a second set of parameter. Relative to the first set of parameter, the second set of parameter includes an offset parameter. The first set of parameter is shared for cell selection and carrier selection in the cell. When the first set of parameter is used for the carrier selection in the cell, an independent offset parameter is configured.

In an exemplary embodiment, the processing module is configured to obtain at least one parameter in the first set of parameter and/or the second set of parameter in at least one of the following manners: high layer RRC signaling, MAC layer signaling, physical layer DCI signaling, a preset configuration, RMSI, OSI and SI.

In an exemplary embodiment, the communication module 20 is configured to perform, when the number of failure times that a Preamble code is transmitted on the uplink carrier reaches a special number of transmission times, PRACH access or Preamble code transmission on an uplink carrier determined by a special rule.

In an exemplary embodiment, the processing module is configured to process, when the number of failure times that the Preamble code is transmitted on the uplink carrier reaches the special number of transmission times, a Preamble counter according to at least one of the following methods: keeping a current value of the Preamble counter; and setting the Preamble counter as an initial value.

In an exemplary embodiment, the processing module is configured to process, before the transmission device performs PRACH access or Preamble code transmission on an uplink carrier determined by a special rule, the Preamble counter according to at least one of the following methods: taking a kept value of the Preamble counter to be an initial value of the Preamble counter on the carrier after switching; enabling the initial value of the Preamble counter on the carrier after switching to be a default initial value; and enabling the initial value of the Preamble counter on the carrier after switching to be a value obtained by subtracting or adding a first Back Off value upon the kept value of the Preamble counter.

In an exemplary embodiment, the processing module is configured to process, when the number of failure times that the Preamble code is transmitted on the configured or selected uplink carrier reaches the special number of transmission times, a power for transmitting the Preamble code according to at least one of the following methods: keeping a current power for transmitting the Preamble code; and setting the transmitting power of the Preamble code as an initial value.

In an exemplary embodiment, the processing module is configured to process, before the transmission device performs PRACH access or Preamble code transmission on an uplink carrier determined by a special rule, the power for transmitting the Preamble code according to at least one of the following methods: taking the kept transmitting power of the Preamble code as an initial transmitting power for transmitting the Preamble code on the carrier after switching; enabling the initial transmitting power for transmitting the Preamble code on the carrier after switching to be a default initial value; and enabling the power for transmitting the Preamble code on the carrier after switching to be a value obtained by adding or subtracting a second Back Off value upon the kept power for transmitting the Preamble code.

In an exemplary embodiment, the processing module is configured to process a power ramping step on the carrier after switching according to at least one of the following methods: enabling the power ramping step to be a value configured on a current carrier; enabling the power ramping step to be a value obtained by adding or subtracting a ramping amount upon a power ramping step on the carrier before switching; enabling the power ramping step to be a value obtained by adding or subtracting a ramping amount upon a value configured on a current carrier; and enabling the power ramping step to be a power ramping step on the carrier before switching.

In an exemplary embodiment, the processing module is configured to enable the number of transmission times of the Preamble code on the carrier after switching to be at least one of the followings: the number of transmission times of the Preamble code is a value configured on a current carrier; the number of transmission times of the Preamble code is the special number of transmission times; the number of transmission times of the Preamble code is the maximum number of transmission times of the Preamble code; and the number of transmission times of the Preamble code is a value obtained by subtracting the number of retransmission times of the Preamble code configured on the carrier before switching upon the maximum number of transmission times of the Preamble code.

When the number of retransmission times of the Preamble code configured on the carrier before switching is smaller than the maximum number of transmission times of the Preamble code, the number of transmission times of the Preamble code is one of the followings: the number of transmission times of the Preamble code is obtained by adding or subtracting a third Back Off value upon the number of transmission times of the Preamble code on the carrier before switching; and the number of transmission times of the Preamble code is obtained by adding or subtracting a third Back Off value upon a value configured on a current carrier; and the number of transmission times of the Preamble code is obtained by adding or subtracting a third Back Off value upon the maximum number of transmission times of the Preamble code.

In an exemplary embodiment, the communication module 20 is configured to perform PRACH access or Preamble code transmission on an uplink carrier determined by a special rule, and the special rule includes at least one of the followings: determining, according to an RSRP value and/or a first RSRP threshold value measured on a downlink resource, the uplink resource for performing the PRACH access process; switching to another uplink carrier configured in the cell; switching to an uplink carrier for configuring and transmitting a Physical Uplink Control Channel (PUCCH) and/or Physical Uplink Shared Channel (PUSCH); and switching to an uplink carrier that is defaulted or has a priority meet a preset requirement.

In an exemplary embodiment, the processing module is configured to process a same RA-RNTI in at least one of the following manners during the PRACH access process of the uplink carrier: when different transmission devices transmit the Preamble code on same PRACH resources of different uplink carriers, processing the RA-RNTI in at least one of the following manners: by carrying a carrier index in the RA-RNTI; carrying a PRACH occasion index in the RA-RNTI; and by uniformly numbering PRACH frequency domain resources on the different carriers, f_ids used to calculate the RA-RNTIs on the different carriers being different in value or value range; when one carrier is configured with one or more BWPs, processing the RA-RNTI in at least one of the following manners: by carrying a BWP index in the RA-RNTI; by carrying a carrier index in the RA-RNTI; by carrying a PRACH occasion index in the RA-RNTI; and by uniformly numbering PRACH frequency domain resources on different BWPs, f_ids used to calculate the RA-RNTIs on the different BWPs being different in value or value range; and when each carrier is configured with one or more BWPs during different carriers, processing the RA-RNTI in at least one of the following manners: by uniformly numbering BWPs on the different carriers, and carrying a carrier index in the RA-RNTI; by carrying a BWP index in the RA-RNTI; by carrying a carrier index in the RA-RNTI; by carrying a PRACH occasion index in the RA-RNTI; and by uniformly numbering PRACH frequency domain resources of BWPs on the different carriers, f_ids used to calculate the RA-RNTIs on the different BWPs being different in value or value range.

In an exemplary embodiment, the processing module is configured to respectively configure at least one of the following communication parameters for the Non-SUL carrier and the SUL carrier.

A Preamble code counter, a power ramping step, a power for transmitting a Preamble code, the number of transmission times of the Preamble code, a format of the Preamble code, an SCS, a BWP, a PRACH time domain resource, a PRACH occasion, a start point of a PRACH frequency domain resource, the number of PRACH frequency domain resources, a PRACH frequency domain offset, a first Back Off value, a second Back Off value and a third Back Off value.

For the Non-SUL carrier and the SUL carrier, a common parameter is configured or initialized. The common parameter may be at least one of the followings: a Preamble code counter, a power ramping step, a power for transmitting a Preamble code, the number of transmission times of the Preamble code, a format of the Preamble code, an SCS, a BWP, a PRACH time domain resource, a PRACH occasion, a start point of a PRACH frequency domain resource, the number of PRACH frequency domain resources, a PRACH frequency domain offset, a first Back Off value, a second Back Off value and a third Back Off value. A parameter not configured in the common parameter is configured independently.

It is to be noted that each module may be implemented by software or hardware. The later may be implemented via the following manner but is not limited thereto: the above modules are located in the same processor; or the above modules are respectively located in different processors in any combined form.

It is to be noted that when the UE provided by the above embodiment performs the random access, the division of each program module is merely illustrative. In actual disclosures, the above processing may be distributed to different program modules as required, that is, an internal structure of the UE is divided into different program modules to complete all or a part of processing described above. In addition, the UE provided by the above embodiment has a same concept with the embodiment of the random access method, and a specific implementation process is detailed in the method embodiment and will no longer repeated herein.

The random access method in the embodiments of the preset disclosure is described below in detail in combination with specific embodiments.

Implementation Manner 1:

In LTE, an RA-RNTI is a function that depends on a time domain resource index and a frequency domain resource index. In a case where one cell is configured with two uplink carriers, the two carriers are a Non-SUL carrier and an SUL carrier. If one UE selects one Preamble for transmission on a PRACH resource of the Non-SUL carrier, the other UE transmits the Preamble code on a same PRACH resource of the SUL carrier. Upon this, on the two carriers, an RA-RNTI value determined according to the time domain resource index and the frequency domain resource index of the PRACH resource is the same. The two UEs obtain a same UL grant when receiving an RAR, and transmit a Msg3 message on a same uplink resource, which results in a conflict and a failure of the PRACH access.

In LTE, the RA-RNTI is calculated in a formula: RA-RNTI=1+t_id+10*f_id. Where, the t_id denotes a time domain subframe index, and 0<=t_id<9; and the f_id denotes a frequency domain subframe index, and 0<=f_id<6.

In NR, the t_id in the formula of the RA-RNTI may denote one of the following indexes: a subframe, a time slot, a symbol, a symbol unit, a PRACH occasion and a PRACH slot. The symbol unit is composed of N symbols. A maximum value in a range that may be denoted by the f_id may be a positive integer greater than 6. A specific maximum value of the f_id depends on the number of PRACH frequency domain resources. The number of PRACH frequency domain resources may be determined in at least one of the following manners: pre-definition, a high layer RRC signaling configuration, an MAC layer configuration, and a physical layer DCI signaling. 10 in the RA-RNTI may be denoted by W. The W may be a positive integer greater than or equal to 1, for example, the W may be one of the followings: 1, 2, 3, 4, 5, 6, 7, 8, 9, 10, 11, 12, 13, 14, 16, 17, 18, 19, 20, etc.

In order to solve the above problem, a solution given in this implementation manner is specifically as follows.

Method 1: a carrier index is introduced into the formula for calculating the RA-RNTI.

For example, in order to solve the above problem, the formula of the RA-RNTI may be denoted as: RA-RNTI=1+t_id+W*f_id+Carrier index, where the Carrier index is 0 and denotes a Non-SUL carrier, and the Carrier index is 1 and denotes an SUL carrier. The method in this implementation manner is also applicable to a case where multiple uplink carriers are provided.

Method 2: a BWP identity is introduced into the formula for calculating the RA-RNTI.

One carrier may have one or more BWPs. There may be one or more initialized and/or activated BWPs.

Concerning the method 2, at least one of the following specific solutions is provided:

Method 2-1: the BWP on one carrier is viewed as a special BWP. It is particular relative to the BWP on the other carrier.

Figure 3:
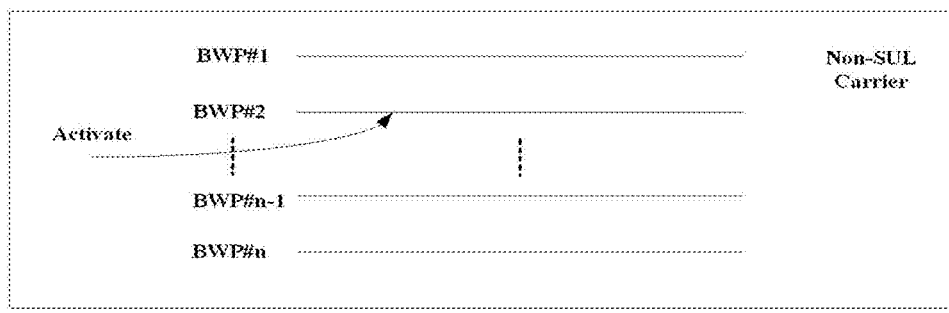
FIG. 3 is a schematic diagram for uniformly labelling a BWP on a Non-SUL carrier and an SUL carrier according to an embodiment.
Figure 3:
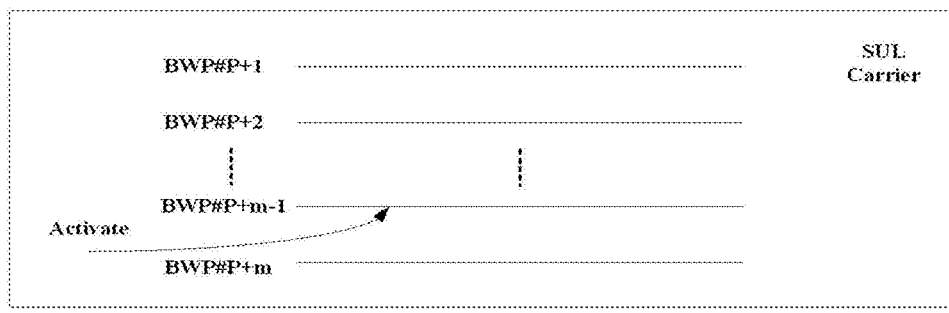

Herein, it is assumed that the BWP on the SUL carrier may be viewed as a special BWP. The BWP on the Non-SUL carrier, and the BWP on the SUL carrier may be uniformly labeled/numbered. As shown in FIG. 3, FIG. 3 is a schematic diagram for uniformly labeling a BWP on a Non-SUL carrier and an SUL carrier according to an embodiment. It is assumed that n BWPs are configured on the SUL carrier, and the BWPs are sequentially labeled as BWP #1, BWP #2, BWP #3, . . . , BWP #n, or, BWP #0, BWP #1, BWP #2, BWP #3, . . . , BWP #n−1.m BWPs are configured on the Non-SUL carrier, and the BWPs are sequentially labeled as BWP #P+1, BWP #P+2, BWP #P+3, . . . , BWP #P+m, wherein the m and the n are a positive integer greater than or equal to 1. A relationship between the m and the n may be one of the followings: the m is greater than the n, the m is smaller than the n, and the m is equal to the n. If the BWPs on the Non-SUL carrier and the SUL carrier are uniformly numbered, the BWP of the SUL carrier serves as a special BWP. The BWP on the SUL is numbered depending on the number of BWPs on the Non-SUL carrier. In FIG. 3, the BWP on the given SUL carrier is numbered from P+1, wherein the P may be a positive integer greater than or equal to n.

Concerning the method 2-1, the RA-RNTIs obtained on same PRACH resources of the SUL and Non-SUL carriers may be varied via different BWP indexes. For example, the formula of the RA-RNTI may be: RA-RNTI=1+t_id+W*f_id+BWP index.

Method 2-2: for each carrier, the BWP on the carrier may be independently labeled or numbered. For such a method, if BWP indexes having the same number on different carriers are activated or selected, the problem in this implementation manner cannot be addressed via the BWP indexes.

Figure 4:
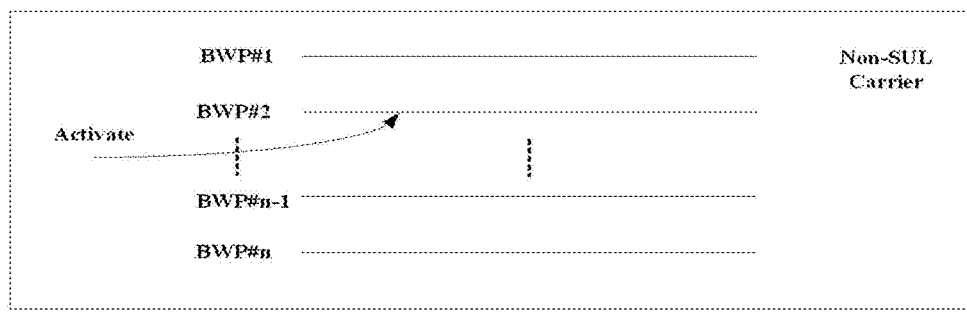
FIG. 4 is a schematic diagram for activating a BWP on a Non-SUL carrier and an SUL carrier according to an embodiment.
Figure 4:
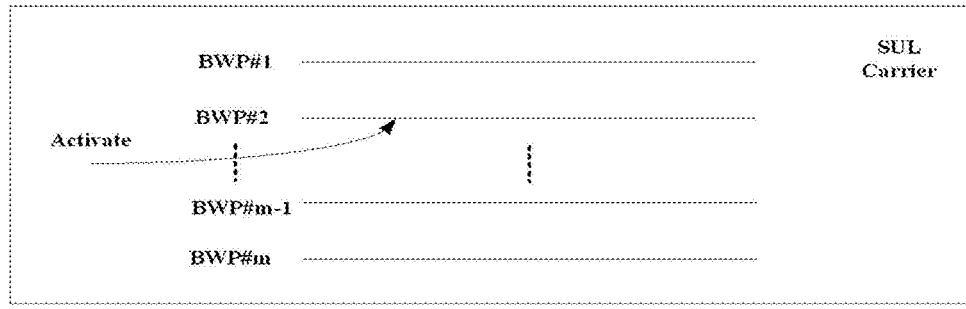

In this sense, it is necessary to give some restriction conditions, for example, the BWPs activated on different carriers have different numbers, as shown in FIG. 4. FIG. 4 is a schematic diagram for activating a BWP on a Non-SUL carrier and an SUL carrier according to an embodiment. It is assumed that n BWPs are configured on the Non-SUL carrier, and the BWPs are sequentially labeled as BWP #1, BWP #2, BWP #3, . . . , BWP #n, or, BWP #0, BWP #1, BWP #2, BWP #3, . . . , BWP #n−1; and m BWPs are configured on the SUL carrier, and the BWPs are sequentially labeled as BWP #1, BWP #2, BWP #3, . . . , BWP #n, or, BWP #0, BWP #1, BWP #2, BWP #3, . . . , BWP #m−1. The m and the n are a positive integer greater than or equal to 1. A relationship between the m and the n may be one of the followings: the m is greater than the n, the m is smaller than the n, and the m is equal to the n.

Additionally, a carrier index may also be introduced to solve the problem in the method 2-2. Upon this, the BWP index and/or the BWP index may also be introduced into the RA-RNTI. For example, RA-RNTI=1+t_id+W*f_id+BWP index; RA-RNTI=1+t_id+W*f_id+Carrier index; and RA-RNTI=1+t_id+W*f_id+Carrier index+BWP index.

Method 3: a BWP identity (index) and a carrier index are introduced into the formula for calculating the RA-RNTI. For example, RA-RNTI=1+t_id+W*f_id+Carrier index+ BWP index.

Method 4: the problem in the implementation manner is solved by a value or a value range of a PRACH frequency domain resource occasion index f_id on the Non-SUL carrier and the SUL carrier.

Figure 5:
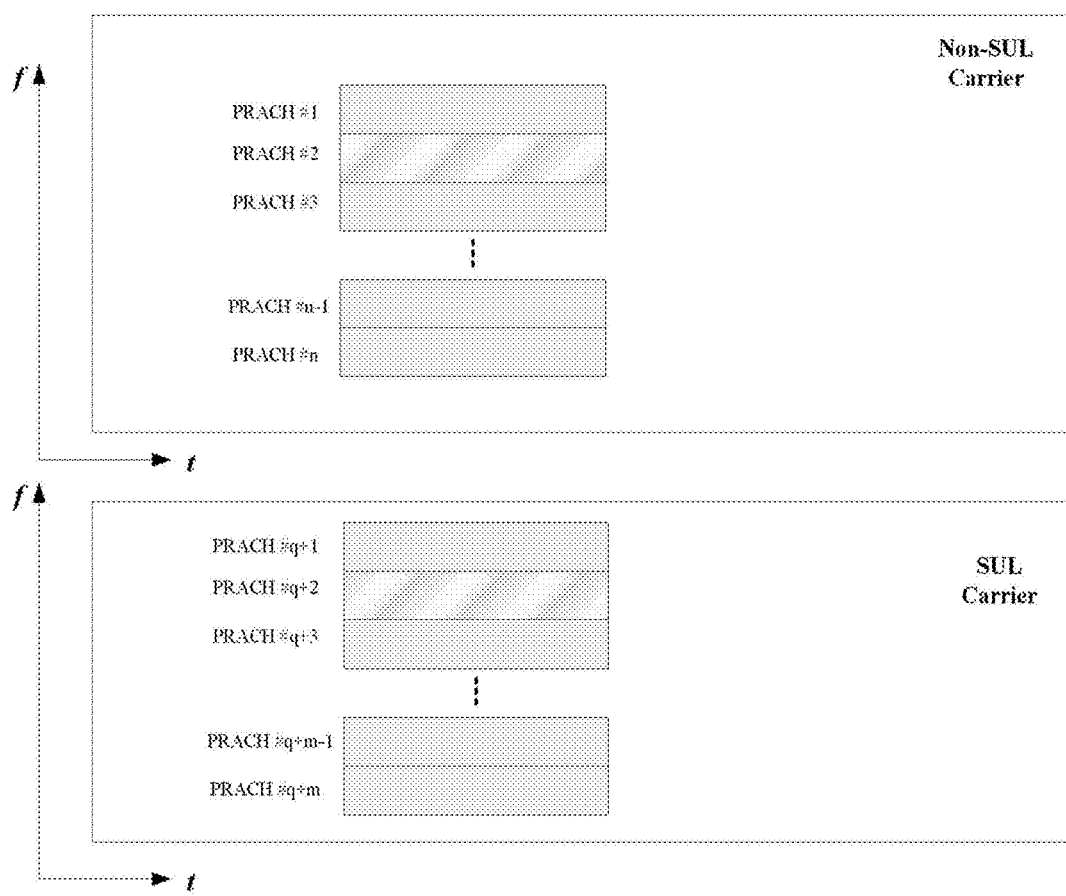
FIG. 5 is a schematic diagram for labelling a PRACH frequency domain resource on a Non-SUL carrier and an SUL carrier according to an embodiment.

Herein, the PRACH frequency domain resource on the SUL carrier may be viewed as a special PRACH frequency domain resource. The special PRACH frequency domain resource is relative to the PRACH frequency domain resource on the Non-SUL carrier. For example, $n_1$ PRACH frequency domain resources are provided on the Non-SUL carrier, and the PRACH frequency domain resources are sequentially numbered from 0 to $n_1-1$, or from 1 to $n_1$. The $n_1$ is a positive integer greater than or equal to 6, the $n_1$ may also be a positive integer greater than or equal to 1. On the SUL carrier, it is assumed that m1 PRACH frequency domain resources are provided in a frequency domain, and the PRACH frequency domain resources may be numbered as PRACH index #q+1, PRACH index #q+2, . . . , PRACH index #q+m, or PRACH index #q+0, PRACH index #q+1, . . . , PRACH index #q+m−1, wherein the q may be a positive integer greater than or equal to n1. As shown in FIG. 5, FIG. 5 is a schematic diagram for labeling a PRACH frequency domain resource on an SUL carrier and a Non-SUL carrier according to an embodiment.

For example, it is assumed that 6 PRACH resources are provided in a frequency domain of the Non-SUL carrier, with f_id in a value range of [0,6). For the SUL carrier, 6 PRACH resources are provided in a frequency domain, with f_id in a value range of [6,12), the W is 10, the PRACH frequency domain resource selected by a UE1 on the Non-SUL carrier is index #2, and the same PRACH resource is selected by the other UE on the SUL. With the utilization of the method 4, on the Non-SUL carrier, RA-RNTI=1+t_id+ 10*f_id=1+2+10*2=23; and for the SUL carrier, RA-RNTI=1+t_id+10*f_id=1+2+10*8=83. Upon this, when receiving an RAR, the UE1 and the UE2 may decode via respective RA-RNTIs to obtain respective UL grants, thus preventing a conflict problem. Thus, the probability of failure of the PRACH access is reduced to some extent.

For the above methods, at least one of the carrier index, the BWP index, the number of PRACH frequency domain resources and the value range of the PRACH frequency domain resource may be configured or obtained via at least one of the followings: high layer RRC signaling, SI, RMSI, OSI, physical layer DCI signaling and an RAR message.

The case having the same RA-RNTI may be processed in at least one of the following manners.

The case where different UEs transmit the Preamble code on same PARCH resources of different carriers may be processed via at least one of the followings:

by introducing a carrier index into the formula of the RA-RNTI;

by introducing a PRACH occasion index into the formula of the RA-RNTI; and by uniformly numbering the PRACH frequency domain resources on different carriers, so that the f_ids for calculating the RA-RNTIs on the different carriers are different in value or value range to solve the problem that the RA-RNTI is the same.

The case where one carrier is configured with one or more BWPs may be processed in at least one of the following manners:

by introducing a BWP index into the formula of the RA-RNTI;

by introducing a carrier index into the formula of the RA-RNTI;

by introducing a PRACH occasion index into the formula of the RA-RNTI; and by uniformly numbering the PRACH frequency domain resources on different BWPs, so that the f_ids for calculating the RA-RNTIs on the different BWPs are different in value or value range to solve the problem that the RA-RNTI is the same.

The case where each carrier of different carriers is configured with one or more BWPs may be processed in at least one of the following manners:

by uniformly numbering BWPs on the different carriers, and introducing a carrier index into the formula of the RA-RNTI to solve the problem that the RA-RNTI is the same;

by introducing a BWP index into the formula of the RA-RNTI;

by introducing a carrier index into the formula of the RA-RNTI;

by introducing a PRACH occasion index into the formula of the RA-RNTI; and by uniformly numbering the PRACH frequency domain resources on BWPs of the different carriers, so that the f_ids for calculating the RA-RNTIs on the different BWPs are different in value or value range to solve the problem that the RA-RNTI is the same.

Implementation Manner 2:

This implementation manner provides a method for processing PRACH access failure. Specifically, in case of the PRACH access failure on a current carrier, which carrier continuously transmits the Preamble code or how to perform PRSCH access is given in this implementation manner. Meanwhile, in case of the PRACH access failure on the current carrier, before a PRACH access process on a reselected carrier, or, after the PRACH access failure on the current carrier, relevant solutions are provided on how to set at least one parameter of a Preamble counter, a power ramping step, a power for transmitting a Preamble code, and the number of transmission times of the Preamble code. Herein, it is assumed that a UE performs a PRACH access process on either of two uplink carriers in a cell. The two carriers are a Non-SUL carrier and an SUL carrier.

In case of PRACH access failure on the selected uplink carrier, the UE may select, according to one of the following methods, a carrier for continuously transmitting a Preamble code or initiating a PRACH process.

Method 1: the UE determines according to an RSRP value measured on a DL resource of the NR Non-SUL carrier to select either of the two carriers to serve as the carrier for continuously transmitting the Preamble code or initiating the PRACH process.

The measured signal may be one of the followings: an SSB, a CSI-RS, a PSS and a PBCH.

The UE compares the measured RSRP with a special first RSRP threshold value, thus determining to select the Non-SUL carrier or the SUL carrier. If the measured RSRP value is smaller than or equal to the first RSRP threshold value, the SUL carrier is selected. If the measured RSRP value is greater than or equal to the first RSRP threshold value, the Non-SUL carrier is selected.

Method 2: it is assumed that the UE determines a new uplink carrier according to a default rule to perform the PRACH access. Herein, the default rule refers to another carrier different from the current carrier. For example, it is assumed that the current selected carrier is the Non-SUL carrier or the SUL carrier; if the current selected carrier has the PRACH access or failed transmission of the Preamble code, the carrier is directly switched to the SUL carrier, or the Non-SUL carrier performs the PRACH access, or transmission of the Preamble code.

Method 3: a carrier for continuously transmitting the Preamble code is determined according to a configured PUCCH and/or a carrier transmitted by a PUSCH.

In case of the PRACH access failure on the current carrier, before a PRACH access process on a switched or new carrier, or, after the PRACH access failure on the current carrier, at least one parameter of a Preamble counter, a power ramping step, a power for transmitting a Preamble code, and the number of transmission times of the Preamble code may be processed according to at least one of the following manners.

In case of the number of transmission times of the Preamble code reaches the preset number of transmission times or the maximum number of transmission times, the Preamble counter is reset, or is not set as an initial value; or, a current current value of the Preamble counter is kept; or, the Preamble counter is set as the initial value. The value of the Preamble counter may serve as an initial value of the Preamble counter for transmitting the Preamble code on a new carrier. Or, the initial value of the Preamble counter for transmitting the Preamble code on the new carrier is obtained by subtracting or adding a first Back Off value upon the value of the Preamble counter. Generally, an initialized value of the Preamble counter is 1.

In a case where the number of transmission times of the Preamble code reaches the preset number of transmission times, or, the maximum number of transmission times, the power for transmitting the Preamble code may be processed according to one of the following manners: the current power for transmitting the Preamble code is kept; the power is not set as the initial transmitting power; and the power is set as the initial transmitting power. The power for transmitting the Preamble code may serve as a power for transmitting the Preamble code on the new carrier, or the power for transmitting the Preamble code on the new carrier is a value obtained by adding or subtracting a second Back Off value upon the power for transmitting the Preamble code.

On the new carrier, the power ramping step may be the same as, or, different from the power ramping step on the carrier before switching. Preferably, the power ramping step on the new carrier is greater than or equal to, or, smaller than or equal to the power ramping step on the carrier before switching.

In a case where the number of transmission times of the Preamble code reaches the preset number of transmission times, or, the maximum number of transmission times, the number of transmission times of the Preamble code may be one of the followings: the maximum number of times for transmitting the Preamble code, the special number of transmission times, and a value obtained by adding or subtracting a third Back Off value upon the number of transmission times on the carrier before switching. The number of transmission times of the Preamble code on the carrier after switching may also be one of the followings: the maximum number of transmission times of the Preamble code, and a special number of transmission times.

For the Non-SUL and the SUL carrier, at least one of the following parameters may be independently configured or initialized: a Preamble code counter, a power ramping step, a power for transmitting a Preamble code, the number of transmission times of the Preamble code, a format of the Preamble code, an SCS, a BWP, a PRACH time domain resource, a PRACH occasion, a start point of a PRACH frequency domain resource, the number of PRACH frequency domain resources, a PRACH frequency domain Offset, a first Back Off value, a second Back Off value and a third Back Off value. Or, for the Non-SUL and the SUL carrier, a common parameter may be configured or initialized. The common parameter may be at least one of the following parameters: a Preamble code counter, a power ramping step, a power for transmitting a Preamble code, the number of transmission times of the Preamble code, a format of the Preamble code, an SCS, a BWP, a PRACH time domain resource, a PRACH occasion, a start point of a PRACH frequency domain resource, the number of PRACH frequency domain resources, a PRACH frequency domain Offset, a first Back Off value, a second Back Off value and a third Back Off value. A parameter not configured in the common parameter may be independently configured.

The parameter may be configured in at least one of the following manners: high layer RRC signaling, SI, RMSI, OSI, physical layer DCI signaling, a pre-defined manner, and MAC layer signaling.

A specific processing method is further described below in detail in combination with the above method.

When the reselected carrier is the carrier before switching, one of the following manners may be considered by the Preamble counter.

Solution 1: the Preamble counter is not subjected to zero clearing, or is not set as an initial value; or a current value of the Preamble counter is kept; or the Preamble counter is set as the initial value. The value of the Preamble counter may serve as an initial value of the Preamble counter for transmitting the Preamble code on the reselected carrier. Or, the initial value of the Preamble counter for transmitting the Preamble code on the reselected carrier is obtained by subtracting or adding a first Back Off value upon the value of the Preamble counter.

For the number of transmission times of the Preamble code, at least one of the following manners may be considered.

Solution 1: the number of transmission times of the Preamble code is the maximum number of transmission times of the Preamble code.

Solution 2: the number of transmission times of the Preamble code is smaller than or equal to the preset number of transmission times.

In other words, when the number of times that the UE transmits the Preamble code on the selected uplink carrier reaches a preset Preamble value, the UE reselects a carrier, or switches to the other carrier to continuously transmit the Preamble code.

For the power ramping step, at least one of the following manners may be considered.

Solution 1: the power ramping step keeps unchanged, or a network side specifies a value of the power ramping step. Herein, the power ramping step is labeled as A.

Solution 2: the value of the power ramping step is smaller or larger. Or, a Back Off value is added or subtracted upon the power ramping step. Herein, the adjusted power ramping step is labeled as B. The A is smaller than the B, or the A is smaller than or equal to the B.

A switched carrier is determined based on a measured RSRP value. If the switched carrier selected based on the RSRP measurement is a carrier before switching:

for the Preamble counter, at least one of the following methods may be considered: an initial value of the Preamble counter is 1; the initial value of the Preamble counter is a value recorded by the Preamble counter when the Preamble code is transmitted at last time on the carrier before switching; and the initial value of the Preamble counter is a value obtained by adding or subtracting a first Back Off value upon the value recorded by the Preamble counter when the Preamble code is transmitted at last time on the carrier before switching.

For the number of transmission times of the Preamble code, at least one of the following methods may be considered: the number of transmission times of the Preamble code is the maximum number of transmission times of the Preamble code; the preset number of transmission times of the Preamble code; a value obtained by adding or subtracting a second Back Off value upon the number of transmission times of the Preamble code before the carrier is switched; and a special value. Herein, the preset number of transmission times of the Preamble code may be smaller than or equal to the maximum number of transmission times of the Preamble code. The special value is a value obtained by subtracting the preset number of transmission times of the Preamble code from the maximum number of transmission times of the Preamble code.

For the power ramping step, at least one of the following manners may be considered.

Solution 1: the power ramping step keeps unchanged, or a network side specifies a value of the power ramping step. Herein, the power ramping step is labeled as A.

Solution 2: the value of the power ramping step is smaller or larger. Or, a Back Off value is added or subtracted upon the power ramping step. Herein, the adjusted power ramping step is labeled as B. The A is smaller than the B, or the A is smaller than or equal to the B.

A switched carrier is determined based on a measured RSRP value. If the switched carrier selected based on the RSRP measurement is not a carrier before switching, or is the other carrier, at least one of the following cases may be considered.

Case 1: the Preamble counter is shared by the Non-SUL carrier and the SUL carrier. A power for transmitting the Preamble code on the carrier after switching is a power for transmitting the Preamble code at last time on the carrier before switching. The power ramping step on the switched carrier is a value that is set initially.

In other words, when the number of times that the UE transmits the Preamble code on the Non-SUL carrier reaches the preset number of times, the current Preamble counter is not reset or is kept. And/or, the power for transmitting the Preamble code is not set as the initial value but is kept at a current value. The above values are used on the carrier after switching.

Case 2: a power for transmitting the Preamble code on the reselected uplink carrier is a value between an initial transmitting power and a power for transmitting the Preamble code before the carrier is reselected.

Case 3: a power for transmitting the Preamble code on the reselected uplink carrier is a value obtained by adding a power offset to an initial transmitting power.

Case 4: two uplink carriers before and after reselection share one Preamble counter, and/or, a power for transmitting the Preamble code on the reselected uplink carrier is based on a power for transmitting the Preamble code at last time on the carrier before reselection.

As an implementation manner, if the transmission of the Preamble code on the reselected uplink carrier is failed, the power ramping step during power escalation may be a value of the power ramping step in existing LTE, or, the value of the power ramping step on the reselected uplink carrier is greater than or smaller than the value of the power ramping step in LTE.

Case 5: two uplink carriers before and after reselection share one Preamble counter, and/or, a power for transmitting the Preamble code on the reselected uplink carrier is a value obtained by subtracting a power offset from the power for transmitting the Preamble code at last time on the carrier before reselection.

As an implementation manner, if the transmission of the Preamble code on the reselected uplink carrier is failed, the power ramping step during power escalation may be a value of the power ramping step in existing LTE, or, the value of the power ramping step on the reselected uplink carrier is greater than or smaller than the value of the power ramping step in LTE.

Case 6: two uplink carriers before and after reselection share one Preamble counter, and/or, a power for transmitting the Preamble code on the reselected uplink carrier is a value obtained by adding a power offset to an initial transmitting power.

As an implementation manner, if the transmission of the Preamble code on the reselected uplink carrier is failed, the power ramping step during power escalation may be a value of the power ramping step in existing LTE, or, the value of the power ramping step on the reselected uplink carrier is greater than or smaller than the value of the power ramping step in LTE.

Case 7: the initial value of the Preamble counter on the reselected uplink carrier is not 0, and the initial value of the Preamble counter may be at least one of the followings.

Manner 1: the initial value of the Preamble counter is a value obtained by adding or subtracting a Back Off value upon a final value of the Preamble counter on the carrier before the carrier is reselected. For example, on the carrier before the carrier is reselected, when the number of times that the UE transmits the Preamble code or the counter is m, it is considered that the UE cannot perform the PRACH access on the carrier. It is noted that: the Preamble counter is not subjected to zero clearing operation, or the value of the counter is kept. Upon this, the UE reselects the carrier according to a certain rule. When the UE transmits the Preamble code for a first time on the reselected uplink carrier, the initial value of the Preamble counter is not 0 but the number of times for transmitting the Preamble code on the carrier before the carrier is reselected or the counter m.

Manner 2: the initial value of the Preamble counter is a value by adding a Back Off value to an original initial value 0 of the Preamble counter.

And/or,

The power for transmitting the Preamble code on the reselected uplink carrier may be at least one of the followings.

Manner 1: the power for transmitting the Preamble code is an initial Preamble transmitting power.

Manner 2: the power for transmitting the Preamble code is a value obtained by adding a power offset to an initial transmitting power.

Manner 3: the power for transmitting the Preamble code is a value obtained by subtracting a power offset from a power for transmitting the Preamble code at last time on the carrier before reselection.

If the transmission of the Preamble code on the reselected uplink carrier is failed, the power ramping step during power escalation may be a value of the power ramping step in existing LTE, or, the value of the power ramping step on the reselected uplink carrier is greater than or smaller than the value of the power ramping step in LTE.

Case 8: the initial value of the Preamble counter on the reselected uplink carrier is 0, and/or, the power for transmitting the Preamble on the reselected uplink carrier may be at least one of the followings.

Manner 1: the power for transmitting the Preamble code is an initial power for transmitting the Preamble code.

Manner 2: the power for transmitting the Preamble code is a value obtained by adding a power offset to an initial transmitting power.

Manner 3: the power for transmitting the Preamble code is a value obtained by subtracting a power offset from a power for transmitting the Preamble code at last time on the carrier before reselection.

If the transmission of the Preamble code on the reselected uplink carrier is failed, the power ramping step during power escalation may be a value of the power ramping step in existing LTE, or, the value of the power ramping step on the reselected uplink carrier is greater than or smaller than the value of the power ramping step in LTE.

Case 9: the Preamble counter on the reselected uplink carrier is an initialized value, that is 0, and/or, the power for transmitting the Preamble code is an initial value. The power ramping step may be a value of the power ramping step in existing LTE, or, the value of the power ramping step on the reselected uplink carrier is greater than or smaller than the value of the power ramping step in LTE.

It is assumed that the UE determines a new uplink carrier according to a default rule to perform the PRACH access. Herein, the default rule refers to another carrier different from the current carrier. For example, it is assumed that the current selected carrier is the Non-SUL carrier or the SUL carrier; if the current selected carrier has the PRACH access or failed transmission of the Preamble code, the carrier is directly switched to the SUL carrier, or the Non-SUL carrier performs the PRACH access, or transmission of the Preamble code.

On the switched or new uplink carrier, processing manners of the Preamble counter and/or the power for transmitting the Preamble code, and/or the power ramping step are similar to the first type.

The reselected uplink carrier may be determined according to a carrier transmitted by a configured PUCCH and/or PUCCH. Specifically, one of the following methods is included.

Method 1: the reselected uplink carrier is the same as a transmission carrier of the configured PUCCH.

The PUCCH may be configured in at least one of the SUL carrier and the Non-SUL carrier. If the PUCCH may be transmitted on the SUL carrier and the Non-SUL carrier, the reselected uplink carrier may be randomly selected from two carriers configured by the PUCCH, or the carrier different from that before reselection is selected, or the carrier same as that before reselection is selected.

Method 2: the reselected uplink carrier is the same as the transmission carrier of the configured PUCCH.

The PUCCH may be configured or scheduled as at least one of the SUL carrier and the Non-SUL carrier. If the PUCCH may be transmitted on the SUL carrier and the Non-SUL carrier, the reselected uplink carrier may be randomly selected from two carriers configured or scheduled by the PUCCH, or the carrier different from that before reselection is selected, or the carrier same as that before reselection is selected.

Method 3: the reselected uplink carrier is the same as a carrier transmitted by the PUCCH and the PUSCH. In other words, the reselected uplink carrier is a carrier which is provided with PUCCH transmission and further schedules the PUSCH on that carrier.

Implementation Manner 3:

The present implementation manner provides a method for determining an RSRP threshold. The RSRP threshold is used for carrier selection. A plurality of uplink carriers are configured in a cell. The plurality of uplink carriers includes at least one of one or more Non-SUL carriers and SUL carriers.

It is assumed that one cell is configured with two uplink carriers, one being the SUL carrier and the other being the Non-SUL carrier. A UE performs PRACH access on either of the two carriers. Further, which carrier in the two carriers is adopted or used to perform the PRACH access is based on an RSRP value measured by the UE. The RSRP value is obtained on the basis of detecting a measurement signal on an NR DL carrier. The measurement signal may be an SSB, a PSS (and/or an SSS), a PBCH, a DMRS or a CSI-RS.

In the cell, a method for determining whether the Non-SUL carrier or the SUL carrier is selected is to: compare with a special first RSRP threshold value based on a measured RSRP value. If the measured RSRP value is smaller than or equal to the first RSRP threshold value, the SUL carrier is selected. If the measured RSRP value is greater than or equal to the first RSRP threshold value, the Non-SUL carrier is selected.

The first RSRP threshold value may be determined in at least one of the following manners.

Manner 1: the first RSRP threshold value is determined by adding or subtracting a special offset upon a first threshold value selected by the cell.

A parameter for determining the first RSRP threshold value may be determined in at least one of the following manners:

Manner 1: a relevant parameter for cell selection and a relevant parameter for carrier selection in the cell is configured independently. For example, the parameter for the cell selection is recorded as a first parameter or parameter set, and the parameter for the carrier selection is recorded as a second parameter or parameter set. A difference between the second parameter or parameter set and the first parameter or parameter set lies in that an offset is introduced.

Manner 2: the offset parameter is configured independently, and other parameters and the parameter or parameter set for the cell selection are shared. That is, the parameter for determining the first RSRP threshold value may be determined by: a parameter or parameter set (recorded as the first parameter or parameter set) same as or shared with that selected by the cell, and the offset parameter configured independently.

The first parameter or parameter set, and/or, the offset parameter, and/or, the second parameter or parameter set may be determined in at least one of the following manners: high layer RRC signaling, physical layer DCI signaling, an RMSI broadcast, and a predefined manner.

For example, a second RSRP threshold value for the cell selection is (A,B). If the measured RSRP value is greater than or equal to the second RSRP threshold, the cell is an affiliated serving cell, or a candidate cell. In a case where the selected cell has multiple carriers, for example, the cell has two uplink carriers, one being a Non-SUL carrier and the other being an SUL carrier, the UE may determine, according to the RSRP value measured in the downlink carrier and the first RSRP threshold, which uplink carrier is selected. First RSRP threshold value=second RSRP threshold value (A,B)+offset. The first RSRP threshold value is a value obtained by calculation or a value in an obtained value set. The offset may be a positive integer between 0 and C. The A, the B and the C have a unit of dbm. Preferably, the C may be 20, or, 30, or, 40. The A and the B are a negative integer and a positive integer respectively. As an example, the first RSRP threshold value is an integer in (−175, −110).

Manner 2: the first RSRP threshold value is notified to the UE via a special manner.

The special manner includes at least one of the followings: high layer RRC signaling, physical layer DCI signaling, an RMSI broadcast, ISO, SI and a pre-defined manner.

A parameter required for the cell selection may be configured via at least one manner of physical layer DCI signaling, MAC layer signaling, physical layer DCI signaling and a preset method. Further, the parameter may be obtained via at least one manner of RMSI, OSI and SI in the above signaling. The parameter includes at least one of the followings: Minimum access level (Qrxlevmin) (that is, a required minimum receiving value), Minimum access level offset (Qrxlevminoffset), Temporary minimum access level offset (Qoffsettemp), compensation (Pcompensation), and Maximum RF output power corresponding to power level (PPowerClass) (which may include PEMAX1 and PEMAX2). The parameter is recorded as a first set of parameter.

In the selected cell, one of two carriers in the cell is selected according to the first RSRP threshold to perform the PRACH access. A manner for obtaining the first RSRP threshold value (for the carrier selection) may be one of the followings.

Manner 1: independent from the parameter (such as the first set of parameter) configured for the cell selection, the first RSRP threshold value (for the carrier selection) may be determined via at least one of the following parameters: Qrxlevmin, Qrxlevminoffset, Qoffsettemp, Pcompensation, PPowerClass (which may include PEMAX1 and PEMAX2), and a special offset. The above parameter may be labeled as a second set of parameter. The parameter of the first RSRP threshold (for the carrier selection) may be configured independent of the parameter for the cell selection. The parameter may be configured or obtained in at least one of the following manners: high layer RRC signaling, MAC layer signaling, physical layer DCI signaling and a preset method. Further, the parameter may be obtained via at least one manner of RMSI, OSI and SI in the above signaling. Relative to the first set of parameter, the offset parameter is introduced into the second set of parameter.

Manner 2: the special offset parameter required to determine the first RSRP threshold (for the carrier selection) may be configured independently. The special offset may be obtained via at least one manner of high layer RRC signaling, MAC layer signaling, physical layer DCI signaling and a preset method. Other parameters required to determine the first RSRP threshold (for the carrier selection) are the same as the parameter required for the cell selection, or, at least one of the following parameters are shared during the determination of the first RSRP threshold (for the carrier selection) and the cell selection: Qrxlevmin, Qrxlevminoffset, Qoffsettemp, Pcompensation and PPowerClass (which may include PEMAX1 and PEMAX2). The shared parameter may be obtained via at least one manner of physical layer DCI signaling, MAC layer signaling, physical layer DCI signaling and a preset method. In other words, the first set of parameter is shared for the cell selection, and the carrier selection in the cell. For the carrier selection in the cell, one offset parameter is further independently configured.

Manner 3: the first RSRP threshold (for the carrier selection) is configured in at least one of the following manners: high layer RRC signaling, MAC layer signaling, physical layer DCI signaling and a preset method. Further, the parameter may be obtained via at least one manner of RMSI, OSI and SI in the above signaling. In other words, the threshold value for the cell selection, and, the threshold value for the carrier selection in the cell are respectively and independently configured.

Through this embodiment, a series of relevant problems involved when a UE performs a random access process on an SUL carrier are solved.

An embodiment of the present disclosure further provides a UE, which includes: a processor and a memory configured to store a computer program capable of running on the processor; and the processor executes, when being configured to run the computer program, the method of the embodiments of the present disclosure.

An embodiment of the present disclosure further provides a storage medium; the storage medium stores a computer program; and the computer program executes, when being run by a processor, the method of the embodiments of the present disclosure.

Optionally, in this embodiment, the storage medium may be configured to store a program code for executing the following step: the program code performs random access on one uplink carrier of L uplink carriers configured in a cell, wherein the L is a positive integer greater than or equal to 1, and the uplink carrier includes at least one of the followings: a Non-SUL carrier and an SUL carrier.

Optionally, in this embodiment, the storage medium may include but not limited to: various media capable of storing a program code such as a U disk, an ROM, an RAM, a mobile hard disk, a magnetic disk or an optical disc.

An embodiment of the present disclosure further provides a processor; the processor is configured to run a computer program; and the computer program executes, when running, the steps of any of the above-mentioned methods.

Optionally, the specific example in this embodiment may be referred to the examples described in the above embodiments and optional implementation manners, and will no longer be repeated herein.

It is apparent that those skilled in the art should understand that the modules or steps of the present disclosure may be implemented by a general-purpose computing device and centralized in a single computing device or distributed over a network consisting of a plurality of computing devices. Optionally, they may be implemented by a program code executable by a computing device, so that they may be stored in a storage device and executed by the computing device. Moreover, they may be different from the steps illustrated or described herein in some cases, or implemented by respectively fabricating them into respective integrated circuit modules or by fabricating a plurality of modules or steps of them into a single integrated circuit module. By doing so, the present disclosure is not limited to any specific combination of hardware and software.

The above descriptions are only preferred embodiments of the present disclosure and are not intended to limit the present disclosure. For the person skilled in the art, the present disclosure may have various modifications and changes. Any modification, equivalent replacement, improvement and the like made within a spirit and a principle of the present disclosure should be included in a protection scope of the present disclosure.

What is claimed is:

1. A random access method, comprising:

performing, by a transmission device, random access on one uplink carrier of L uplink carriers configured in a cell, wherein L is a positive integer greater than or equal to 1, and the uplink carrier comprises at least one of the followings: a Non-Supplement Uplink (SUL) carrier and an SUL carrier;

wherein during a Physical Random Access Channel (PRACH) access process of the uplink carrier, in order to avoid the same Random Access-Radio Network Temporary Identity (RA-RNTI) for different UL carriers or different BWPs of each carrier, processing in at least one of the following manners:

when different transmission devices transmit the Preamble code on same PRACH resources of different uplink carriers, processing via at least one of the followings:

by carrying a carrier index in the RA-RNTI;

by carrying a PRACH occasion index in the RA-RNTI; and by uniformly numbering PRACH frequency domain resources on the different carriers, f_ids used to calculate the RA-RNTIs on the different carriers being different in value or value range;

when one carrier is configured with one or more Bandwidth Partials, BWPs, processing via at least one of the followings:

by carrying a BWP index in the RA-RNTI;

by carrying a carrier index in the RA-RNTI;

by carrying a PRACH occasion index in the RA-RNTI; and by uniformly numbering PRACH frequency domain resources on different BWPs, f_ids used to calculate the RA-RNTIs on the different BWPs being different in value or value range; and when each carrier is configured with one or more BWPs during different carriers, processing via at least one of the followings:

by uniformly numbering BWPs on the different carriers, and carrying a carrier index in the RA-RNTI;

by carrying a BWP index in the RA-RNTI;

by carrying a carrier index in the RA-RNTI;

by carrying a PRACH occasion index in the RA-RNTI; and by uniformly numbering PRACH frequency domain resources of BWPs on the different carriers, f_ids used to calculate the RA-RNTIs on the different BWPs being different in value or value range.

2. The method as claimed in claim 1, wherein when the L uplink carriers configured in the cell comprise the SUL carrier, determining the uplink carrier for performing a Physical Random Access Channel (PRACH) access process in at least one of following manners:

determining, by the transmission device, the uplink carrier for performing the PRACH access process based on a measured Reference Signal Received Power (RSRP) value and/or a first RSRP threshold value, and the RSRP value and/or the first RSRP threshold value being obtained on the basis of measuring a special measurement signal transmitted on a downlink resource;

determining, by the transmission device, the uplink carrier for performing the PRACH access process based on carrier information indicated by signaling; and determining, by the transmission device, the uplink carrier for performing the PRACH access process based on default or predefined information.

3. The method as claimed in claim 2, wherein the special measurement signal comprises at least one of the followings: a Synchronization Signal Block (SSB), a Channel State Information-Reference Signal (CSI-RS), a Primary Synchronization Signal (PSS), a Secondary Synchronization Signal (SSS), and a Physical Broadcast Channel (PBCH).

4. The method as claimed in claim 2, wherein the determining the uplink carrier for performing the PRACH access process based on a measured RSRP value and/or a first RSRP threshold value comprises at least one of the followings:

comparing the measured RSRP value with the first RSRP threshold value;

when the measured RSRP value is smaller than or equal to the first RSRP threshold value, selecting the SUL carrier or the Non-SUL carrier; and when the measured RSRP value is greater than or equal to the first RSRP threshold value, selecting the Non-SUL carrier or the SUL carrier.

5. The method as claimed in claim 2, wherein the first RSRP threshold value is determined in at least one of the following manners:

determining the first RSRP threshold value based on a second threshold value selected by the cell and an offset; and determining or obtaining the first RSRP threshold value based on pre-defined, notified or indicated information.

6. The method as claimed in claim 5, wherein the notified or indicated information comprises at least one of the followings: high layer Radio Resource Control (RRC) signaling, physical layer Downlink Control Information (DCI) signaling, physical layer Media Access Control (MAC) signaling, Remaining Minimum System Information (RMSI), System Information (SI) and Other System Information (OSI).

7. The method as claimed in claim 5, wherein determining the first RSRP threshold value based on a second threshold value selected by the cell and an offset comprises one of the followings:

determining the first RSRP threshold value by adding the offset to the second threshold value selected by the cell; and determining the first RSRP threshold value by subtracting the from the second threshold value selected by the cell.

8. The method as claimed in claim 5, wherein the transmission device determines or obtains at least one of the following parameters: the first RSRP threshold value, the offset, the second threshold value, and a parameter required for cell selection, in at least one of the following manners:

determining the second threshold selected by the cell according to a first set of parameter, and determining the first RSRP threshold for carrier selection in the cell according to a second set of parameter, wherein relative to the first set of parameter, the second set of parameter comprises an offset parameter; and the first set of parameter is shared for cell selection and carrier selection in the cell, wherein when the first set of parameter is used for the carrier selection in the cell, an independent offset parameter is configured.

9. The method as claimed in claim 8, wherein at least one parameter in the first set of parameter and/or the second set of parameter is obtained in at least one of the following manners:

high layer RRC signaling, MAC layer signaling, physical layer DCI signaling, a preset configuration, RMSI, OSI and SI.

10. The method as claimed in claim 1, wherein the performing, by the transmission device, the random access on the uplink carrier comprises:
when number of failure times that a Preamble code is transmitted on the uplink carrier reaches a special number of transmission times, performing, by the transmission device, PRACH access or Preamble code transmission on an uplink carrier determined by a special rule.

11. The method as claimed in claim 10, wherein the method further comprises:
when the number of failure times that the Preamble code is transmitted on the configured or selected uplink carrier reaches the special number of transmission times, processing a Preamble counter according to at least one of the following methods:
keeping a current value of the Preamble counter; and
setting the Preamble counter as an initial value.

12. The method as claimed in claim 10, wherein the method further comprises: before the performing, by the transmission device, PRACH access or Preamble code transmission on an uplink carrier determined by a special rule, processing the Preamble counter according to at least one of the following methods:
taking a kept value of the Preamble counter as an initial value of the Preamble counter on the carrier after switching;
enabling the initial value of the Preamble counter on the carrier after switching to be a default initial value; and
enabling the initial value of the Preamble counter on the carrier after switching to be a value obtained by subtracting or adding a first Back Off value upon the kept value of the Preamble counter.

13. The method as claimed in claim 10, wherein the method further comprises:
when the number of failure times that the Preamble code is transmitted on the configured or selected uplink carrier reaches the special number of transmission times, processing a power for transmitting the Preamble according to at least one of the following methods:
keeping a current power for transmitting the Preamble; and
setting the transmitting power of the Preamble code as the initial value.

14. The method as claimed in claim 10, wherein the method further comprises:
before the performing, by the transmission device, PRACH access or Preamble code transmission on an uplink carrier determined by a special rule, processing the power for transmitting the Preamble code according to at least one of the following methods:
taking the kept transmitting power of the Preamble code as an initial transmitting power for transmitting the Preamble on the carrier after switching;
enabling the initial transmitting power for transmitting the Preamble code on the carrier after switching to be a default initial value; and
enabling the power for transmitting the Preamble code on the carrier after switching to be a value obtained by adding or subtracting a second Back Off value upon the kept power for transmitting the Preamble code.

15. The method as claimed in claim 10, wherein the method further comprises:
processing a power ramping step on the carrier after switching according to at least one of the following methods:
enabling the power ramping step to be a value configured on a current carrier;
enabling the power ramping step to be a value obtained by adding or subtracting a ramping amount upon a power ramping step on the carrier before switching;
enabling the power ramping step to be a value obtained by adding or subtracting a ramping amount upon the value configured on the current carrier; and
enabling the power ramping step to be a power ramping step on the carrier before switching.

16. The method as claimed in claim 10, wherein the method further comprises:
enabling the number of transmission times of the Preamble code on the carrier after switching to be at least one of the followings:
the number of transmission times of the Preamble code is a value configured on a current carrier;
the number of transmission times of the Preamble code is the special number of transmission times;
the number of transmission times of the Preamble code is the maximum number of transmission times of the Preamble code; and
the number of transmission times of the Preamble code is a value obtained by subtracting the number of retransmission times of the Preamble code configured on the carrier before switching upon the maximum number of transmission times of the Preamble code,
wherein when the number of retransmission times of the Preamble code configured on the carrier before switching is smaller than the maximum number of transmission times of the Preamble code, the number of transmission times of the Preamble code is one of the followings:
the number of transmission times of the Preamble code is obtained by adding or subtracting a third Back Off value upon the number of transmission times of the Preamble code on the carrier before switching;
the number of transmission times of the Preamble code is obtained by adding or subtracting a third Back Off value upon a value configured on a current carrier; and
the number of transmission times of the Preamble code is obtained by adding or subtracting a third Back Off value upon the maximum number of transmission times of the Preamble code.

17. The method as claimed in claim 10, wherein the special rule comprises at least one of the followings:
determining, according to an RSRP value and/or a first RSRP threshold value measured on a downlink resource, the uplink resource for performing the PRACH access process;
switching to another uplink carrier configured in the cell;
switching to an uplink carrier for configuring and transmitting a Physical Uplink Control Channel (PUCCH) and/or Physical Uplink Shared Channel (PUSCH); and
switching to an uplink carrier that is defaulted or has a priority meet a preset requirement.

18. A processor, configured to run a computer program, wherein the computer program executes, when running, the method as claimed in claim 1.

19. User Equipment (UE), comprising: a processor and a memory configured to store a computer program capable of running on the processor, wherein the processor executes, when being configured to run the computer program, the method as claimed in claim 1.

20. User Equipment (UE), comprising:
a communication module, configured to perform random access on one uplink carrier of L uplink carriers configured in a cell,
wherein L is a positive integer greater than or equal to 1, and the uplink carrier comprises at least one of the followings: a Non-Supplement Uplink (SUL) carrier and an SUL carrier;
wherein during a Physical Random Access Channel (PRACH) access process of the uplink carrier, in order to avoid the same Random Access-Radio Network Temporary Identity (RA-RNTI) for different UL carriers or different BWPs of each carrier, the UE is configured to process in at least one of the following manners:
when different transmission devices transmit the Preamble code on same PRACH resources of different uplink carriers, processing via at least one of the followings:
by carrying a carrier index in the RA-RNTI;
by carrying a PRACH occasion index in the RA-RNTI; and
by uniformly numbering PRACH frequency domain resources on the different carriers, f_ids used to calculate the RA-RNTIs on the different carriers being different in value or value range;
when one carrier is configured with one or more Bandwidth Partials, BWPs, processing via at least one of the followings:
by carrying a BWP index in the RA-RNTI;
by carrying a carrier index in the RA-RNTI;
by carrying a PRACH occasion index in the RA-RNTI; and
by uniformly numbering PRACH frequency domain resources on different BWPs, f_ids used to calculate the RA-RNTIs on the different BWPs being different in value or value range; and
when each carrier is configured with one or more BWPs during different carriers, processing via at least one of the followings:
by uniformly numbering BWPs on the different carriers, and carrying a carrier index in the RA-RNTI;
by carrying a BWP index in the RA-RNTI;
by carrying a carrier index in the RA-RNTI;
by carrying a PRACH occasion index in the RA-RNTI; and
by uniformly numbering PRACH frequency domain resources of BWPs on the different carriers, f_ids used to calculate the RA-RNTIs on the different BWPs being different in value or value range.

* * * * *